US012700657B2

(12) United States Patent
Zhang et al.

(10) Patent No.: US 12,700,657 B2
(45) Date of Patent: Aug. 4, 2026

(54) SLOW-WAVE HYBRID MAGNONICS BASED ON INTERACTING MAGNONS AND SPOOF SURFACE PLASMON POLARITONS

(71) Applicants: Northeastern University, Boston, MA (US); UChicago Argonne, LLC, Lemont, IL (US)

(72) Inventors: Xufeng Zhang, Wellesley, MA (US); Jing Xu, Bartlett, IL (US)

(73) Assignees: Northeastern University, Boston, MA (US); UChicago Argonne, LLC, Lemont, IL (US)

( * ) Notice: Subject to any disclaimer, the term of this patent is extended or adjusted under 35 U.S.C. 154(b) by 161 days.

(21) Appl. No.: 18/664,951

(22) Filed: May 15, 2024

(65) Prior Publication Data

US 2024/0387974 A1 Nov. 21, 2024

Related U.S. Application Data

(60) Provisional application No. 63/553,924, filed on Feb. 15, 2024, provisional application No. 63/502,222, filed on May 15, 2023.

(51) Int. Cl.
*H01P 7/00* (2006.01)
*H01P 3/08* (2006.01)

(52) U.S. Cl.
CPC ................ *H01P 7/00* (2013.01); *H01P 3/081* (2013.01)

(58) Field of Classification Search
CPC .................................. H01P 7/00; H01P 3/081
See application file for complete search history.

(56) References Cited

U.S. PATENT DOCUMENTS

2012/0133454 A1* 5/2012 Wu .......................... H01P 3/08 333/33
2016/0149285 A1* 5/2016 Gao ....................... H01P 1/203 333/204

* cited by examiner

*Primary Examiner* — Samuel S Outten
(74) *Attorney, Agent, or Firm* — Dana M. Gordon; John D. Lanza; Foley Hoag LLP

(57) ABSTRACT

A method for broadband, high-efficiency spin wave transduction adopts a slow-wave structure to enhance the interaction of electromagnetic waves and spin waves.

9 Claims, 4 Drawing Sheets

SLOW-WAVE HYBRID MAGNONICS BASED ON INTERACTING MAGNONS AND SPOOF SURFACE PLASMON POLARITONS

CROSS REFERENCE TO RELATED APPLICATIONS

This application claims priority to U.S. Provisional Patent Application No. 63/553,924 filed on Feb. 15, 2024, entitled SLOW-WAVE HYBRID MAGNONICS BASED ON INTERACTING MAGNONS AND SPOOF SURFACE PLASMON POLARITONS, and to U.S. Provisional Patent Application No. 63/502,222 filed on May 15, 2023, entitled SLOW-WAVE HYBRID MAGNONICS BASED ON INTERACTING MAGNONS AND SPOOF SURFACE PLASMON POLARITONS, the contents of each of which is hereby incorporated by reference.

BACKGROUND

Cavity magnonics refers to the coherent, interaction between magnons and photons in a resonant cavity. Cavity magnonics may have applications in quantum transduction, quantum communication and signal processing, quantum sensing and quantum memory architectures. However, despite its potential, cavity magnonics is limited by narrow interaction bandwidth.

BRIEF SUMMARY

This invention describes an innovative approach to efficiently couple spin waves with electromagnetic waves for broadband, high-efficiency spin wave transduction.

Spin waves refer to collective excitation of spins (magnetization) in magnetic materials. When the magnetization is perturbed, it typically will precess around its equilibrium position like a spinning top. Such precessional motion can propagate from one spin to another as a wave, referred to as a spin wave. In quantum mechanical language, spin waves are quantized as quasiparticles known as magnons. Spin waves and magnons exist in magnetic materials such as magnetic alloys, ferrimagnets, ferromagnets, and antiferromagnets.

The most common methods of exciting and detecting spin waves is to send electromagnetic waves of the same frequencies as the spin waves (typically in the GHz to THz range) to the magnetic material. The electromagnetic waves, i.e., microwave/mm wave/THz waves, will perturb the magnetization of the material and cause the precession of the spins, which will consequently excite the spin wave. In a reverse process, spin waves can be converted to electromagnetic waves and be detected.

Among all physical mechanisms (e.g., Brillouin light scattering, spin transfer torque), the most commonly used method is based on waveguides (coplanar waveguides, microstrips, etc.) because of its properties such as low cost, high efficiency, and broad bandwidth. However, the waveguide approach provides excitation/detection efficiency only for bulky magnonic devices. As the device volume reduces, for example, on integrated magnonic circuits, the excitation and detection efficiencies are significantly reduced, making it very challenging to excite and detect the spin waves.

Some of the challenges faced by waveguides can be addressed by using cavities or resonators, these approaches reduce bandwidth significantly, typically on the order of several MHz). So it is desirable to develop a transduction mechanism between electromagnetic waves and spin waves that has both high efficiency and large bandwidth.

This invention discloses a novel method for such broadband, high-efficiency spin wave transduction. By adopting a slow-wave structure, the interaction of electromagnetic waves and spin waves are significantly enhanced, while its bandwidth is still very large because the electromagnetic waves are in the form of broadband traveling waves instead of narrowband resonances. Using our approach, a broad bandwidth of over 7 GHz is achieved, with significantly improved excitation/detection efficiency (more than 10 dB and up to 40 Db improvement in the measured spin wave signals). This invention is the first to combine spoof surface plasmon polaritons (SSPPs) and magnonics, and our general approach can be applied to other magnonic systems, such as optomagnonics (light-spin wave coupling) and magnomechanics (acoustic wave-spin wave coupling).

In one aspect, the technology relates to a device having a spoof surface plasmon polariton (SSPP) waveguide and a magnetic resonator disposed on the SSPP waveguide.

In some embodiments, the SSPP waveguide is a metallic microstrip.

In other embodiments, the SSPP waveguide includes a plurality of corrugations. In some of these other embodiments, the plurality of corrugations has a frequency of 500 micrometers. In some other of these embodiments, the SSPP waveguide includes magnetic resonators. In further embodiments, the magnetic resonators are disposed at the bottom of a respective one of the plurality of corrugations.

In further embodiments, the SSPP waveguide includes a magnetic resonator comprising a ferromagnetic insulator disposed on a substrate. In some of these further embodiments the ferromagnetic insulator comprises epitaxial yttrium iron garnet and in others of these embodiments, the substrate comprises gadolinium gallium garnet.

BRIEF DESCRIPTION OF THE DRAWINGS

In the drawings, like reference characters identify corresponding elements throughout and like reference numerals generally indicate identical, functionally similar, or structurally similar elements. Although specific features of various embodiments may be shown in some drawings and not in others, this is for convenience only. Any feature of any drawing may be referenced and/or claimed in combination with any feature of any other drawing.

FIG. 4(*d*) depicts a comparison of the extinction ratios for SSPP waveguides and coplanar waveguides.

DETAILED DESCRIPTION

The presently described systems and methods may introduce the emerging research field of magnons to another promising field spoof surface plasmon polaritons, which combines the magnetic tunability of magnons with the strong field localization and small propagation velocity of the spoof surface plasmon polaritons.

The presently described systems and methods may significantly expand the operation bandwidth while maintaining a large coupling efficiency between electromagnetic waves and magnons (spin waves) as compared with previous hybrid magnonic devices.

The presently described systems and methods may exhibit significantly enhanced coupling efficiency between electromagnetic waves and magnons without scarifying the operation bandwidth, as compared with previous waveguide coupled magnonic devices.

In various embodiments, the disclosed subject matter may be highly suitable for device miniaturization (to micro and nanoscale integrated devices), the parameters and performance of the device can be conveniently tailored through geometric engineering, and as a hybrid magnonic device, the design is highly compact, scalable, and cost-effective.

Various embodiments of the disclosed subject matter may be utilized for high-efficiency spin wave excitation for integrated spintronic devices, broadband magnon detection for integrated spintronic devices, on-chip interconnects for spintronic components, and large-scale integrated magnonic networks (e.g., for neuromorphic computing or magnon logic), among others. In various embodiments, the presently described subject matter may be utilized for broadband and high-efficiency transducers for write/read of spin wave signals on integrated spintronics chips. In various embodiments, the subject matter here described may by utilized for quantum information processing, specifically, magnon-based quantum information transduction and interconnection.

In various embodiments, the spoof SPP technology for coupling with magnonics (spintronics) is CMOS compatible and can be fabricated in large scale using standard photolithography and metal deposition processes. It can be operated using common, inexpensive microwave electronics (sources and detectors).

Figure 1:
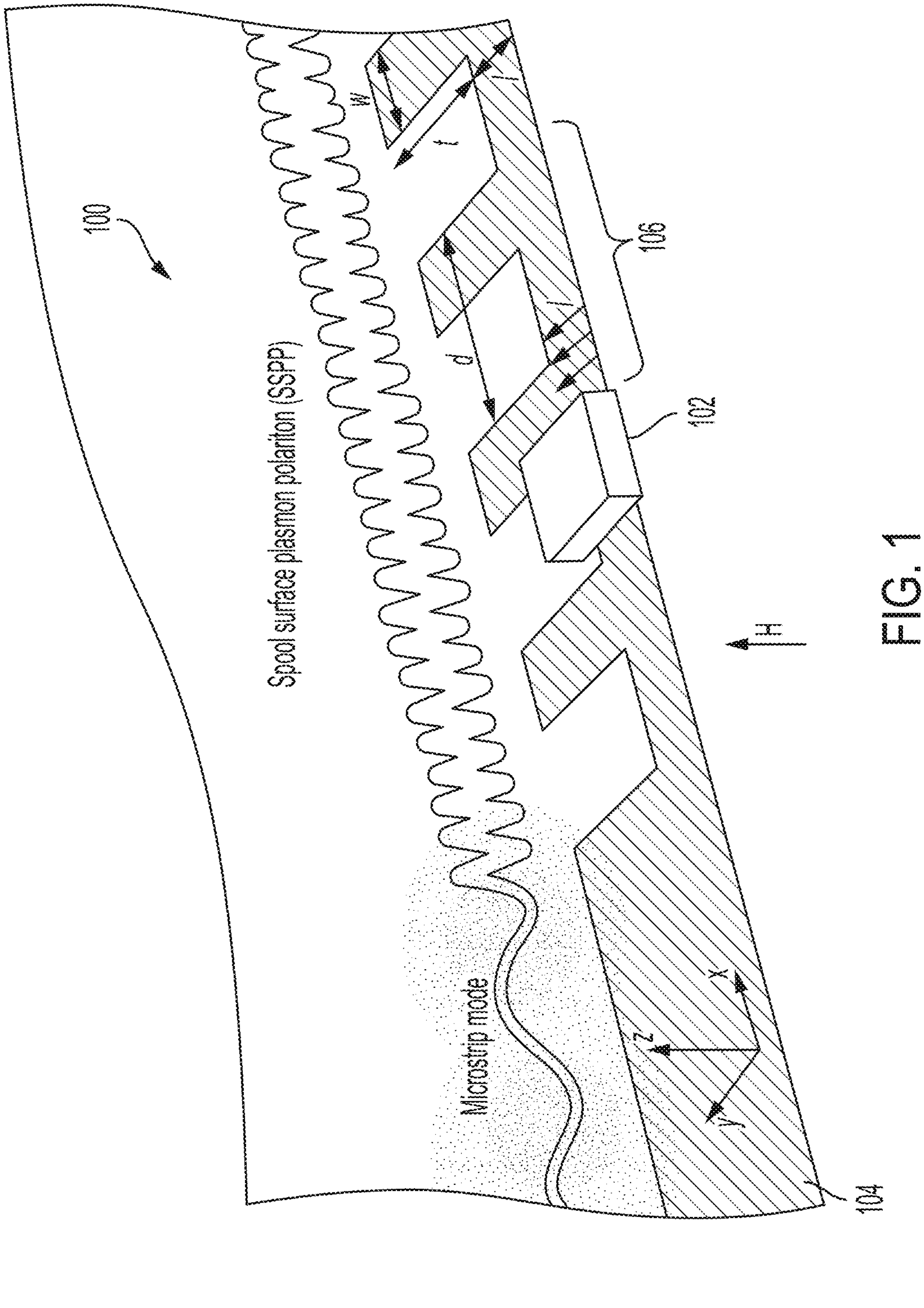
FIG. 1 depicts a schematic view of one embodiment of a hybrid SSPP-magnonic device.

Referring now to FIG. 1, and in brief overview, one embodiment of a hybrid SSPP-magnonic device 100 is shown. As shown in FIG. 1, a magnetic resonator 102 is disposed on an SSPP waveguide 104. In the embodiment shown in FIG. 1, the SSPP waveguide 104 includes corrugations 106 of period, d. The tooth of each corrugation has width, w, and height, t.

Figure 2:
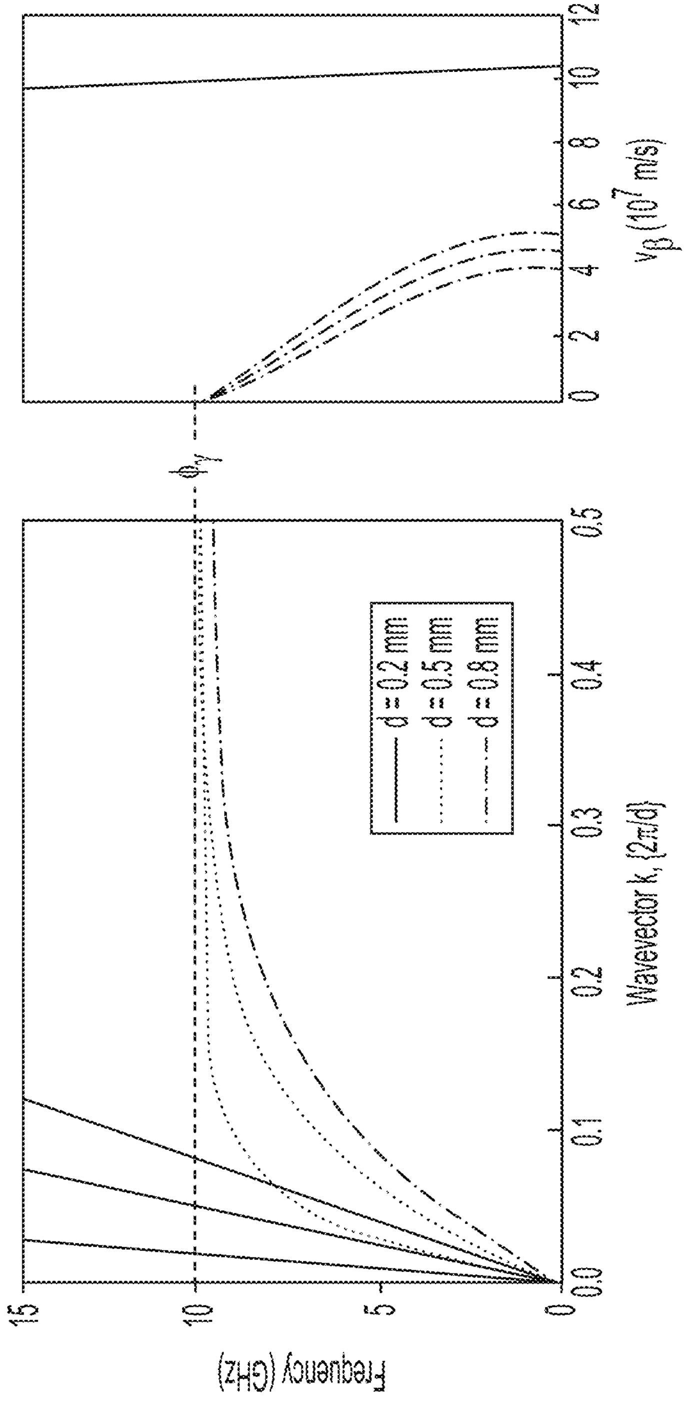
FIG. 2 depicts simulated dispersion and group velocities of SSPP modes on a waveguide constructed in accordance with the description.

FIG. 2 depicts simulated dispersion curves of the fundamental mode on the SSPP waveguide of FIG. 1. As can be seen in FIG. 2, SSPP dispersions (depicted in solid lines) deviate significantly from the dispersion of the uncorrugated microstrip modes (dotted lines), typically due to the large wave-vectors provided by Bragg reflection on the periodic waveguide structure. At the edge of the first Brillouin zone (wave-vector $k_x=\pi/d$), the SSPP mode dispersion becomes nearly flat and approaches an asymptotic frequency, i.e., the effective plasma frequency, where the group velocity is largely reduced.

The asymptotic frequencies of the SSPP modes are primarily determined by the microstrip width, w, (or equivalently, the length of the corrugation teeth, t). For a microstrip width of 3 mm, an asymptotic frequency of around 10 GHz can be obtained. The dispersion curve can be fine-tuned by altering the corrugation period, d, which has little effect on the asymptotic frequency. This is shown in FIG. 2 by the three different dispersion curves and the extracted group velocities for three corrugation periods. The effect of the corrugation teeth width is negligible.

As the frequency approaches the edge of the SSPP band, the decreasing group velocity is accompanied by the enhanced mode confinement, which can even reach deep sub-wavelength level. Referring back to FIG. 1, the magnetic fields of the SSPP modes are localized at the bottom of the corrugation teeth (along the horizontal line in the x direction), where planar magnonic resonators can be placed to couple with the SSPP mode through magnetic dipole-dipole interaction.

In some embodiments, an external magnetic field is applied to bias the magnonic resonator for magnon mode excitation, which can be used to tune the magnon frequency. To maximize the magnon-SSPP coupling, the bias field may be along the out-of-plane direction, i.e., perpendicular to the magnetic field of the SSPP mode which is in-plane and transverse to the propagation direction at the position of the magnonic resonator. Compared with conventional microstrips or coplanar waveguides, the SSPP mode on the corrugated microstrip depicted by FIG. 1 has significantly reduced mode volume and group velocity, which is expected to lead to increased coupling strengths between the magnon mode and the microwave photon mode, i.e., the SSPP mode.

Experiment

An SSPP waveguide having a corrugation period of 500 micrometers was fabricated using a high-dielectric constant printed circuit board ($\xi$=9.8). A magnonic resonator was fabricated from a 200-nm epitaxial yttrium iron garnet (YIG), a ferri-magnetic insulator known for its low magnetic damping, on a gadolinium gallium garnet (GGG) substrate. The lateral size of the fabricated YIG resonators ranged from tens to hundreds of micrometers. A magnonic chip was bonded to the SSPP waveguide circuit via a flip-chip approach with precise alignments facilitated by the transparency of the YIG/GGG chip. An out-of-plane bias magnetic field was applied using a permanent magnet to support the magnon modes in the YIG resonator.

Figure 3B:
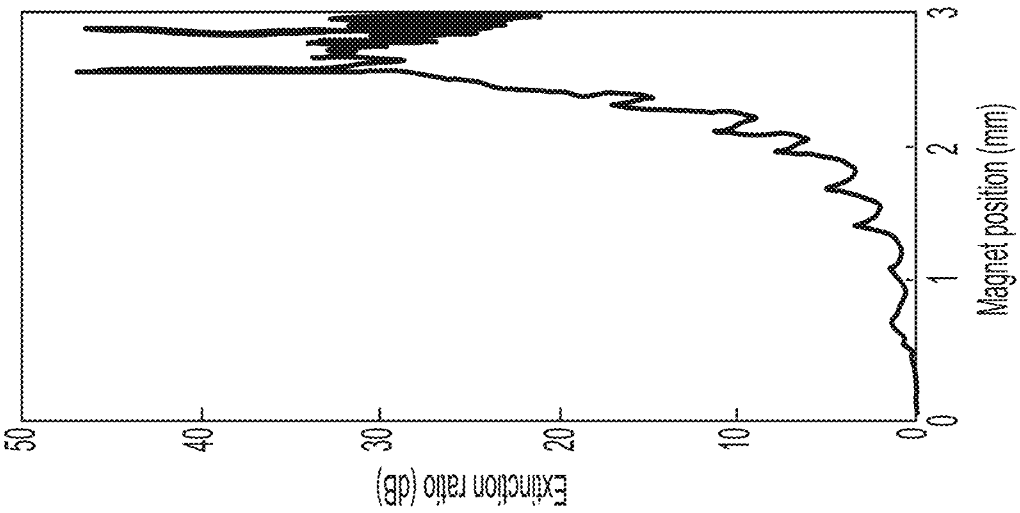
FIGS. 3(*a*) and 3(*b*) depict measured transmission spectra and extinction ratio as a function of magnet position.
Figure 3A:
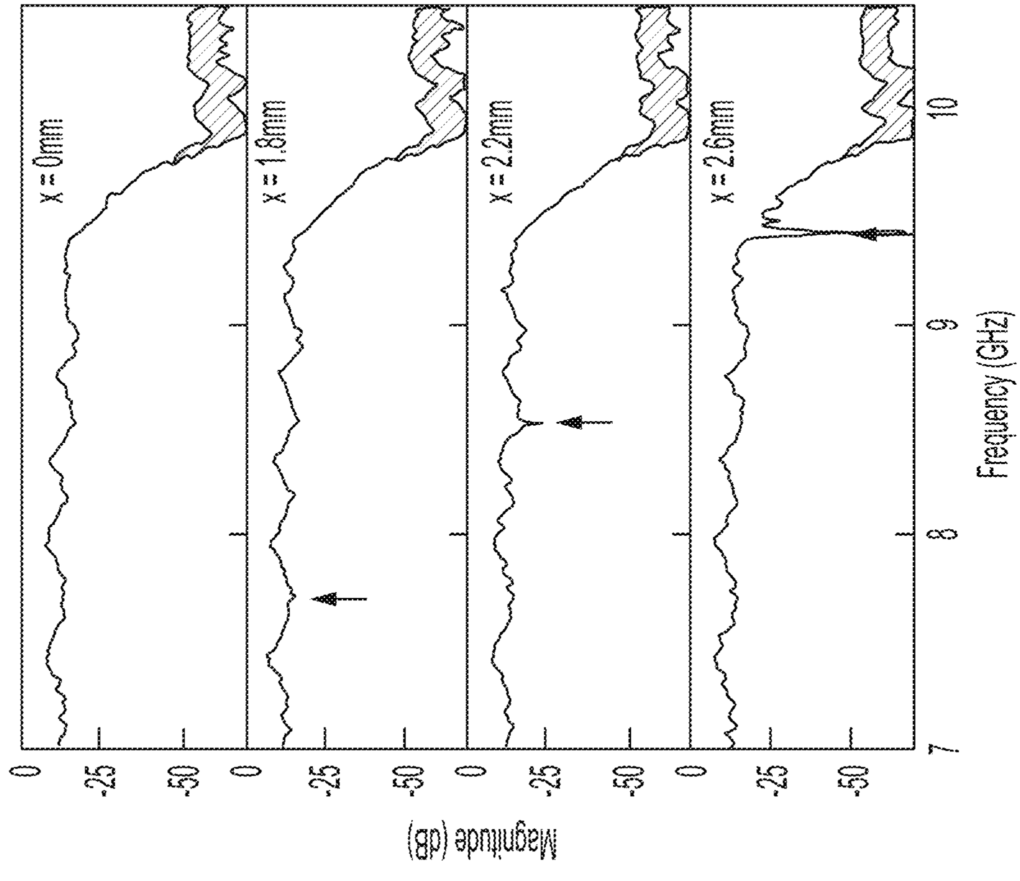

FIG. 3(*a*) shows the measurement results for a magnonic resonator with a size of 300 micrometers×1000 micrometers×200 nanometers. To characterize the intrinsic transmission of the SSPP waveguide when the magnon mode is absent, the bias magnet was moved far away from the device (at a position x=0 mm). A. broad transmission band was observed with an insertion loss around 12 dB, which may be attributed to the coupling loss from the RF connectors as well as the metal absorption loss. As shown in FIG. 3(*a*), the transmission band exhibits a cutoff frequency at around 10 GHZ, which corresponds to the effective plasma frequency of the SSPP mode. As depicted in FIG. 3(*a*), above the cutoff frequency, the SSPP mode is no longer supported and consequently the transmission drops to below-50 dB.

When the bias magnet was moved closer to the device, the magnon modes show up in the transmission spectrum as a series of narrow absorption dips. The magnon modes were observed over a broad frequency range when the position of the biasing magnet was changed. With the magnet position at x=1.8 mm, the magnon resonances are visible at 7.7 GHZ. As the magnet was moved closer to the device, the elevated magnetic field increased the magnon frequencies (e.g., 8.5 GHz at x=2.2 mm, and 9.4 GHz at x=2.6 mm).

One unique feature of these magnon resonances is that their extinction ratio increases as the magnon frequency approaches the SSPP cutoff frequency. This is evident from the transmission spectra depicted by FIG. 3(*b*), which show a more visible magnon absorption dip with a much larger extinction ratio at x=2.6 mm than the magnon dip observed at x=1.8 mm. FIG. 3(*b*) summarizes the extinction ratio of the magnon resonance dips as a function of bias magnet position, which show clearly that the extinction ratio increases as the magnet position (accordingly, the magnon frequency) increases. The small oscillations of the extinction. ratio in the curve may be due to the interference effects of the SSPPs when propagating along the waveguide with a finite length, which is much weaker than the enhancement effect caused by the increased magnon frequency. A maximum extinction ratio of 47 dB is observed at the edge of the cutoff frequency (x=2.58 mm), which is more than four orders of magnitude higher than what is obtained near x=0 mm. As the magnet position was increased further, the extinction ratio saturated at a level around 30 dB.

Figures 4A, 4B, 4C, 4D:
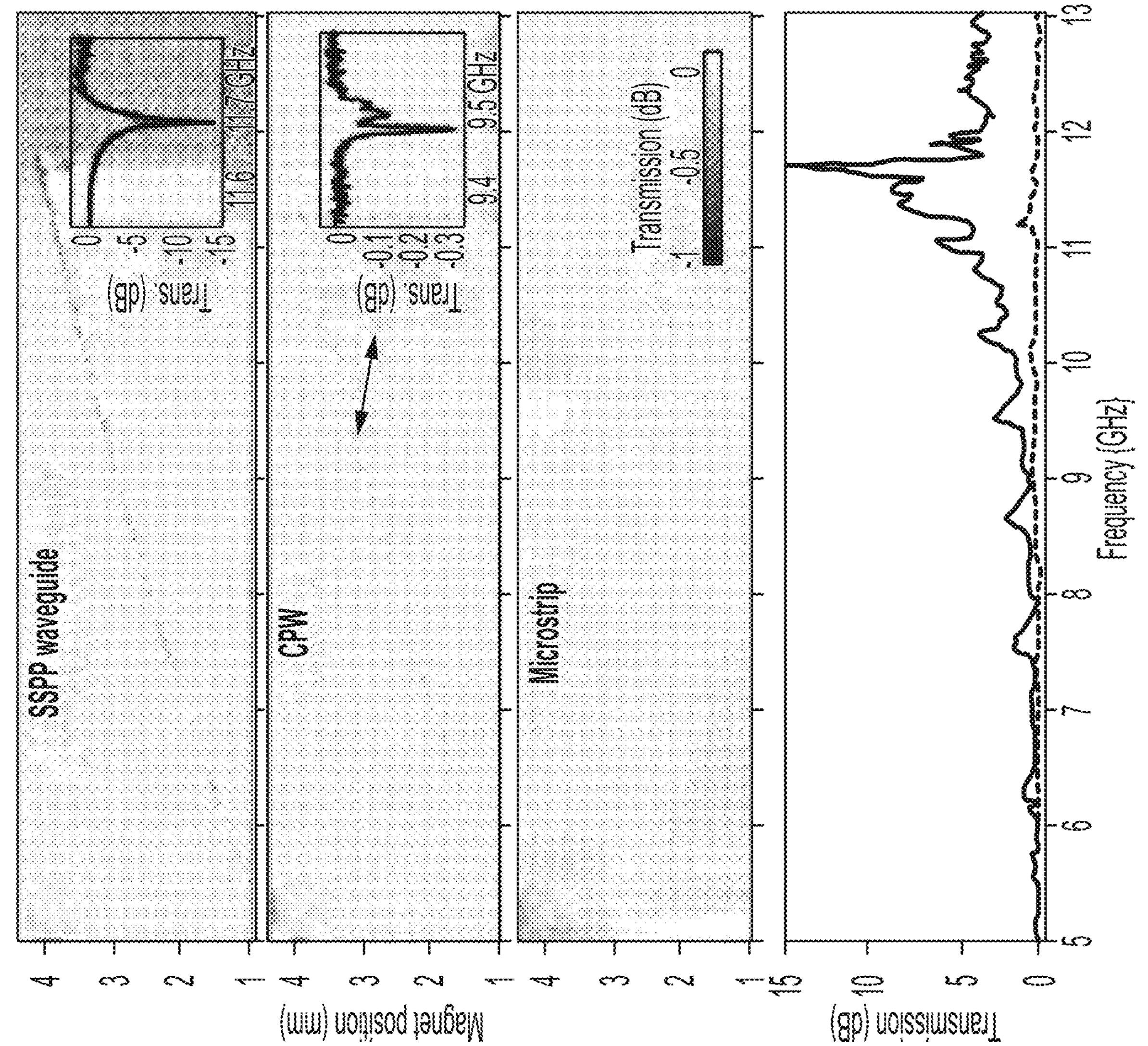
FIGS. 4(*a*)-(*c*) depict measured transmission spectra for an SSPP waveguide, coplanar waveguide and microstrip, respectively.

The advantage of coupling magnons using SSPPs is further demonstrated by comparing conventional magnon-hybridization approaches using planar structures such as co-planer waveguides or un-corrugated microstrips. FIG. 4(*a*)-(*d*) plots measured transmission spectra as a function of the magnet position for a SSPP waveguide, a coplanar waveguide, and a microstrip, respectively. The same magnonic resonator with a dimension of 400 micrometers× 400 micrometers was used on all three waveguide devices. In all these spectra, the transmission background from the waveguides, obtained when the magnon modes were absent, were removed to reveal the small magnon resonance features. Compared with the spectra in FIG. 3(*a*), the magnon modes become less visible because of the reduced YIG resonator size, but a large extinction ratio up to 15 dB can still be obtained on the SSPP waveguide near the cutoff frequency 11.8 GHZ. As a comparison, the maximum extinction. ratio obtained on the coplanar waveguide is only 0.3 dB, which is two orders of magnitude smaller than the SSPP waveguide, implying much reduced coupling between the magnon and coplanar waveguide modes. On the uncorrugated microstrip, the magnon modes completely disappear, indicating negligible coupling between the bulky microstrip and the YIG micro-resonators.

Quantitative comparison between the SSPP waveguide and the coplanar waveguide is shown in FIG. 4(*d*). Although the magnon mode is visible in a wide frequency range, the extinction ratio is very small (less than 1 dB) throughout the band [dashed line in FIG. 4(*d*)]. While on the SSPP waveguide, the magnon modes were observed with a much higher extinction ratio (up to 15 dB) through a bandwidth over 7 GHz (from the SSPP cutoff frequency 11.8 GHz down to 5 GHz and below) [solid line in FIG. 4(*d*)].

Because of their propagating nature, the SSPP modes can be used to provide interconnects among different magnonic resonators, potentially in large-scale magnonic resonator array. An integrated device with an magnonic resonator array containing 50 rectangular YIG resonators (dimensions: 50 micrometers×90 micrometers×200 nanometers, period: 100 micrometers) was fabricated. For this device, the SSPP waveguide was fabricated by depositing gold directly on the YIG/GGG chip after the photolithography process with careful alignment. By applying a graded bias magnetic field through slight tilting of the permanent magnet, the magnon resonance frequencies of all the YIG resonators have an offset from one another, leading to a comb-like transmission spectrum with multimode magnon resonances.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. A device comprising:

a spoof surface plasmon polariton (SSPP) waveguide; and a magnetic resonator comprising a ferromagnetic insulator disposed on the SSPP waveguide, the magnetic resonator coupling with a spoof surface plasmon polariton mode of the SSPP waveguide through magnetic dipole-dipole interaction.

2. The device of claim 1 wherein the SSPP waveguide includes a plurality of corrugations.

3. The device of claim 2 further comprising a plurality of magnetic resonators.

4. The device of claim 3 wherein each of the plurality or magnetic resonators is disposed at the bottom of a respective one of the plurality of corrugations.

5. The device of claim 2 wherein the plurality of corrugations has a period of 500 micrometers.

6. The device of claim 1 wherein the magnetic resonator comprises a ferromagnetic insulator disposed on a substrate.

7. The device of claim 6 wherein the ferromagnetic insulator comprises epitaxial yttrium iron garnet.

8. The device of claim 6 wherein the substrate comprises gadolinium gallium garnet.

9. The device of claim 1, wherein the SSPP waveguide comprises a metallic microstrip.

* * * * *